Dec. 2, 1958 H. W. ABBOTT ET AL 2,863,136

SIGNAL TRANSLATING DEVICE

Filed Jan. 3, 1957 2 Sheets-Sheet 1

BLOCKED

UNBLOCKED

REVERSE BLOCKED

INVENTORS:
HAROLD W. ABBOTT,
JEROME J. SURAN,

BY Robert J. Steinmeyer
THEIR ATTORNEY.

Dec. 2, 1958 H. W. ABBOTT ET AL 2,863,136

SIGNAL TRANSLATING DEVICE

Filed Jan. 3, 1957 2 Sheets-Sheet 2

INVENTORS:
HAROLD W. ABBOTT,
JEROME J. SURAN,

BY Robert J. Steinmeyer
THEIR ATTORNEY.

United States Patent Office 2,863,136

Patented Dec. 2, 1958

2,863,136

SIGNAL TRANSLATING DEVICE

Harold W. Abbott, Cohoes, and Jerome J. Suran, Syracuse, N. Y., assignors to General Electric Company, a corporation of New York Application January 3, 1957, Serial No. 632,342

9 Claims. (Cl. 340—174)

This invention relates to signal translating devices. More particularly, the invention relates to multipath magnetic core devices for performing signal gating and switching as well as logical operations which are commonly used, for example, in information handling systems.

One known magnetic device for performing some of these functions is described by J. A. Rajchman and A. W. Lo in an article entitled "The Transfluxor—A Magnetic Gate With Stored Variable Setting," appearing at pages 303–311 of volume XVI, No. 2, of the "RCA Review," published by RCA Laboratories, Princeton, New Jersey, June 15, 1955. This known device comprises a three-legged core of magnetic material having a nearly rectangular hysteresis loop. The core has two circular apertures of unequal diameter arranged so that the material between each of the two apertures and the respective adjacent edge of the core forms first and third legs respectively, while the material between the two apertures themselves forms the second leg of the three-legged core. A control winding is placed on the first leg bounding the larger aperture. The minimum cross-sectional area of this leg is equal to the sum of the smallest cross-sectional areas of the other two legs. Signal input and signal output windings are placed on the third leg.

In operation, a current pulse sent through the control winding will saturate the two smaller legs in the same direction since the larger leg provides the necessary flux return path for the flux from both of the smaller legs. The core is now said to be "blocked" since a small alternating current signal applied to the input winding will not be transferred to the output winding. This is due to the fact that the remanent flux has the same direction (and is nearly equal to the saturation flux) in both the second and third legs bounding the small aperture. At least a part of the shortest magnetic circuit coupling the input and output windings is therefore already saturated with respect to either polarity of the A.-C. signal and no flux can be transferred to link the windings. To "unblock" the core and permit passage of a small alternating current signal from the input to the output winding, a second pulse, smaller in absolute value than, and of opposite polarity to, the first or "blocking" pulse, is applied to the control winding. When the core is unblocked a small applied A.-C. signal may be viewed as transferring flux back and forth between the second and third legs in a magnetic circuit surrounding the smaller aperture and a signal output may be derived. The blocked or unblocked states of the core may thus be considered to represent stored binary information which can be non-destructively read out by a small A.-C. read-out signal. In other words, the A.-C. signal is switched on and off in accordance with whether the core is unblocked or blocked even after the control signals producing these states have been removed. The device may thus also be considered to be an "inhibit" gate with stored setting, as will be apparent to those skilled in the art.

In this device the "unblocking" pulse must be of sufficient magnitude to reverse at least part of the flux in the second leg but must not be large enough to reverse the flux in both the second and third legs. Of course it will be understood that ideally, due to relation path lengths resulting from the geometry of the core, there will be no flux change in the third leg until reversal of flux in the second leg has been carried to saturation. If the unblocking pulse exceeds the maximum critical value, and hence also reverses flux in the third leg, then the core simply becomes blocked in the opposite or reverse direction. In order to prevent this accidental reverse blocking it has been conventional practice to apply the unblocking pulse through a current limiting device such as a resistor. This expedient, however, results in a relatively slow voltage build-up across the winding and consequently severely limits the switching speeds which can be achieved in unblocking the core. Furthermore, even when the unblocking current is limited to the correct value, departures from an ideally rectangular hysteresis loop which, in practice, characterize available materials results in unwanted voltages being induced in the output winding of the device by unblocking as well as by blocking currents.

The above described device has the following salient disadvantages: (1) the blocking and unblocking pulses must be of opposite polarities which is not convenient in all applications; (2) the unblocking pulse must not only be above a critical minimum magnitude necessary to reverse the flux in one leg, but must also be below a critical maximum magnitude to prevent reversal of the flux in both legs, a range condition which varies with varying ambient temperature conditions; (3) the core may be accidently blocked in the reverse direction by a sufficiently large unblocking pulse; (4) blocking and unblocking signals produce spurious signals in the output winding; and (5) the device is restricted in the logic of its operation to that of a single pulse controlled or inhibit gate with stored setting.

It is therefore an object of this invention to provide a magnetic core signal translating device which overcomes the above described disadvantages of known devices.

It is a further object of this invention to provide a multipath magnetic gate capable of being switched at higher speeds than have heretofore been possible.

It is a further object of this invention to provide a multipath magnetic core device which may be used either as an inhibit gate with stored variable setting or which may be used to perform more complex logical operations.

It is a more specific object of this invention to provide a multipath magnetic core device in which the unblocking pulse may have either desired polarity relative to the blocking pulse and may have a magnitude which exceeds a given minimum critical value by any amount without resulting in reverse blocking of the core or in spurious voltages being induced in the output winding.

Briefly, in accordance with one aspect of the invention, a core of magnetic material having a nearly rectangular hysteresis loop is provided with four separate and mutually contiguous apertures. The material between any two of the apertures forms one of five interior legs, and the material between any one of the apertures and the periphery of the core forms one of four peripheral legs of a nine-legged core. Each of eight of the legs preferably have substantially the same minimum cross-sectional area while one of the peripheral legs has a minimum cross-sectional area equal to at least twice the smallest cross-sectional area of any one of the other legs. A blocking winding is placed on the largest peripheral leg and separate unblocking windings are placed on the two adjacent peripheral legs. The unblocking windings may either be connected in series for simple gating functions or may have separate terminals to form a logical "and-or" gate, that is, to form a core which may be unblocked by pulses applied to either or both of the separate unblocking windings. Input and output signal translating windings are placed on the fourth peripheral leg and on at least one of the interior legs. In either type of gate, the fact that the unblocking windings are separate from the blocking winding permits the core to be wound to accept either polarity of unblocking pulse. Furthermore, the separate interior and peripheral magnetic circuits or paths afforded by the nine-legged configuration eliminates the possibility of spurious blocking by unblocking pulses of excessive magnitude and renders the device faster, less critical, and more stable in operation.

While the novel and distinctive features of the invention are particularly pointed out in the appended claims, a more expository treatment of the invention, in principle and detail, together with additional objects and advantages thereof, is afforded by the following description and accompanying drawings of representative embodiments in which:

Figures 1, 2, 3:
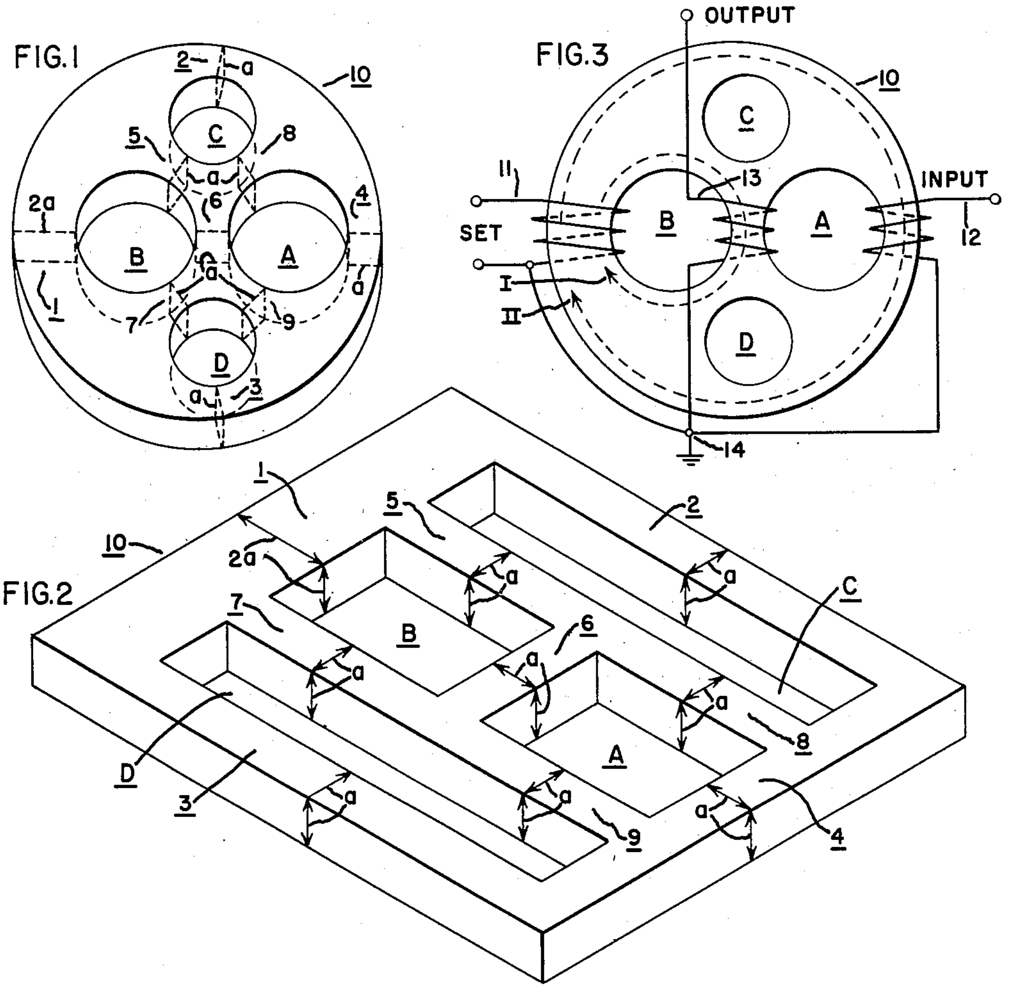
Figure 1 is a perspective view of a magnetic core configuration suitable for use in the devices of the present invention.
Figure 2 is a perspective view of an alternate core configuration which may also be used in the devices of the present invention.
Figure 3 is a schematic plan view illustrating one mode of winding the core of Figure 1.
Figures 7, 8, 9, 10, 11, 12, 13:
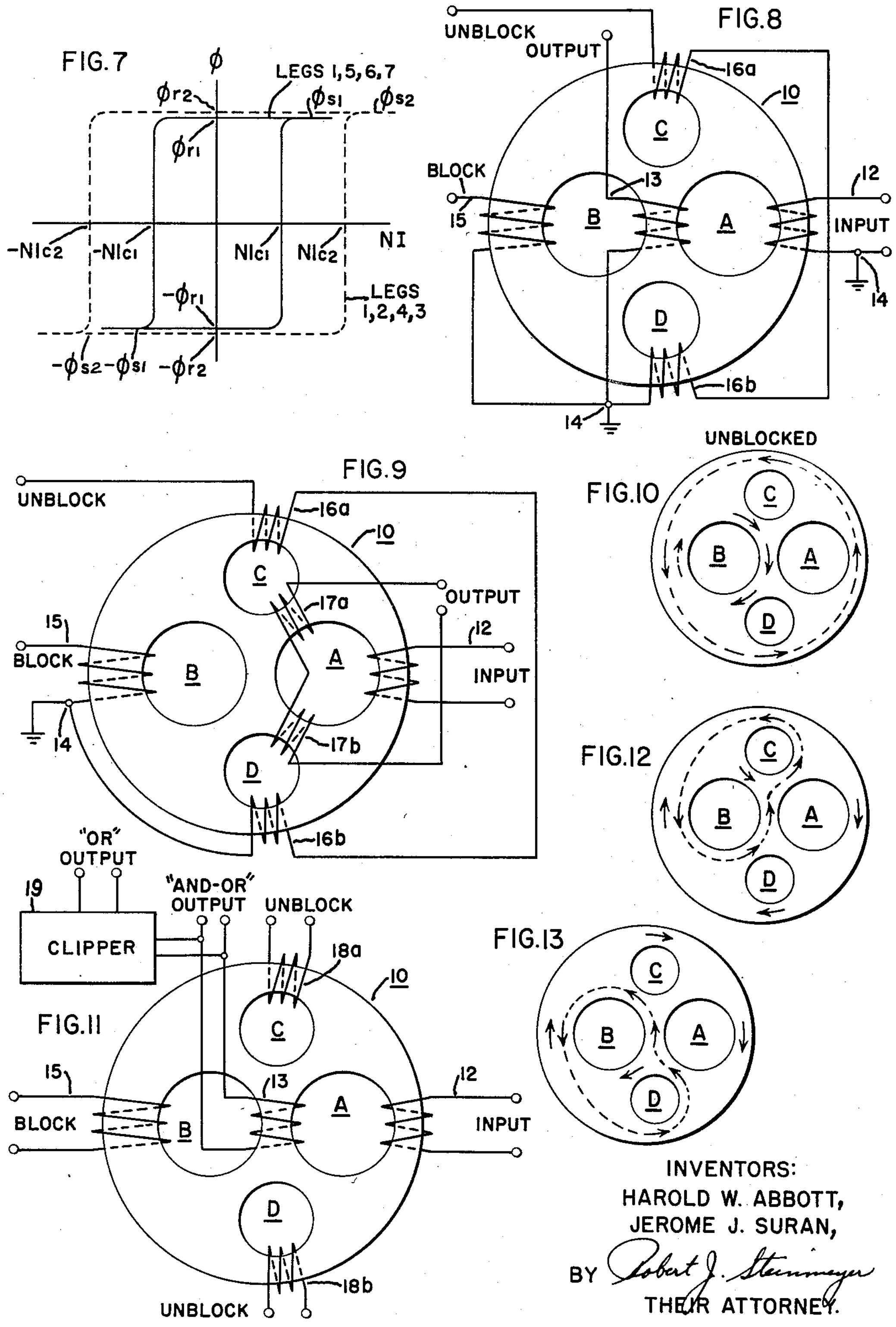
Figure 7 is a plot of typical hysteresis characteristics for the two flux paths of the device of Fig. 3.
Figures 8 and 9 are schematic plan views illustrating two preferred ways in which the cores of Fig. 1 or 2 may be wound as an "inhibit" gate.
Figure 10 is a flux diagram showing the direction of flux flow and flux distribution in the legs of the devices of Figs. 8 and 9 when the cores are unblocked.
Figure 11 is a schematic plan view illustrating a manner of winding the cores of Fig. 1 or 3 to provide an "and-or" gate which also affords an "exclusive or" signal.
Figures 12 and 13 are flux diagrams illustrating flux distribution and flux flow paths by which the core of Fig. 11 may be unblocked in accordance with the logic of an "and-or" gate.

Turning now to the drawings, and in particular to Fig. 1, there is shown a core 10 which is formed of a magnetic material having a substantially rectangular hysteresis characteristic as generally illustrated in Fig. 7. The material of the core is preferably a molded ferrite ceramic, such as the well-known "General Ceramic S–1," but it will of course be understood that any material, ferrite or otherwise, having the above noted substantially rectangular magnetic hysteresis characteristic may be used. Core 10 is preferably molded in the form of a flat slab of material which may, for example, have either a generally circular outline or periphery, as illustrated in Figure 1, or a generally rectangular outline or periphery as illustrated in Figure 2. As will become apparent from the discussion below, however, neither a uniform slab thickness nor a particular overall shape is critical to the operation of the device and numerous alternative configurations will be apparent to those skilled in the art.

In the configurations of both Figures 1 and 2, core 10 is provided with four separate but mutually contiguous apertures, A, B, C, and D. For the purposes of this specification the term "mutually contiguous" is used to mean that the smallest cross-sectional area, $a^2$, of the material between any two of the apertures is approximately equal to the smallest cross-sectional area of the material between any other two apertures. As shown in Figures 1 and 2 the material between any one pair of apertures forms one of the five interior legs, 5, 6, 7, 8 and 9, of the nine-legged core. Each of the other four legs, 1, 2, 3 and 4, is respectively formed by the material between one of the apertures and the edge or periphery of the core and is therefore herein called a "peripheral leg." It will be apparent that one closed magnetic circuit or flux path through peripheral legs 1, 2, 4, and 3 is formed around the edge or periphery of the core. Numerous other flux paths may be formed by utilizing the interior legs as well as the peripheral legs in a manner which will be described in detail below.

For proper operation of the device one of the peripheral legs, herein shown as leg 1, should have a minimum cross-sectional area, $2a^2$, which is at least equal to twice the smallest cross-sectional area of any of the other eight legs. In practice it is desirable to also make the smallest cross-sectional area of each of the other legs, 2, 3, 4, 5, 6, 7, 8 and 9, equal to a common cross-sectional area and hence to each other. If the core consists of a slab of uniform thickness, the smallest cross-sectional area of any leg will of course be determined by its smallest width. This smallest width may exist at a single point of the leg as in the configuration shown in Figure 1, or it may prevail throughout the length of the leg as shown in the configuration of Figure 2.

In practice, the rectangular hole configuration of Figure 2 results in a substantially better signal-to-noise ratio in the operation of the devices than does the circular hole configurations of Fig. 1, but the principles of operation of the devices are the same for cores of either of the configurations shown in Figures 1 and 2. The term "signal-to-noise ratio" is here used to mean the ratio of A.-C. signal output in the unblocked state to the small A.-C. signal output which in practice occurs even in the blocked state for the same applied A.-C. input. The improved signal-to-noise ratio for the core configuration of Figure 2 is believed to depend upon the fact that when one of the legs of such a core saturates it is saturated throughout its entire volume. By contrast, when a circular aperture configuration is used, each leg has its smallest cross-sectional area near the center thereof and is larger at both ends of the leg. Consequently, the center of the leg saturates and blocks flux flow before the ends are fully saturated. Switching or flux change in response to applied fields appears to exist to a certain extent in the unsaturated portions of the larger ends even though the leg as such is saturated and blocked to the flow of flux therethrough.

In either of the core configurations illustrated in Figures 1 and 2, it is apparent that there are three theoretically possible closed flux paths which include the leg 1. These paths are formed respectively by legs 1, 5, 6, 7; legs 1, 5, 8, 4, 9, 7; and legs 1, 2, 4, 3. It will, however, be recalled that the smallest cross-sectional areas of legs 5 and 7 are made equal to each other and to the smallest cross-sectional area of leg 6. Consequently, when the core of either Figure 1 or 2 is wound as illustrated in Figure 3, flux can in fact flow through only the first and third of the above noted three theoretically possible paths as will be explained in detail below. The two actually possible paths are the two which provide the minimum and the maximum path lengths respectively in the nine-legged core and thus provide a greater difference in blocking path length than can be realized between the two blocking paths of a three-legged core. This greater difference in path lengths in turn results in a considerable increase of the "set margin" of this four-hole core by comparison to the "set margin" obtainable from a two hole core. For the purposes of this specification, the term "set margin" is used to mean the difference between the number of ampere-turns required to block a given core and that required to unblock the same core.

Figure 4:
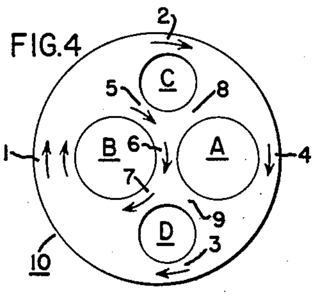
Figures 4, 5 and 6 are flux diagrams showing the direction of flux distribution in the blocked, unblocked and reverse-blocked states, respectively, for the device of Figure 3.

In Figure 3 the core 10 is shown provided with a control winding 11 wound on the first peripheral leg 1, and input signal translating winding 12 wound on remote peripheral leg 4, and an output signal translating winding 13 wound on interior leg 6. One side of each of these windings may conveniently be connected to a common ground point 14. When a blocking pulse is applied to winding 11, the shortest magnetic path, that is, the path through legs 1, 5, 6, and 7 will be the first to become saturated. The magnetic hysteresis characteristic for this path is illustrated in the solid line plot of the graph of Figure 7. This graph is a plot of the flux, $\phi$, as a function of the ampere-turns, NI, producing the flux. Of course it will be realized that the magnetomotive forces is by definition equal to $0.4\pi NI$. A blocking pulse which produces ampere-turns greater that the minimum critical value shown as $NI_{c1}$, the ampere-turns required to reverse the direction of flux in the first path, will saturate the path through legs 1, 5, 6, 7. Furthermore, after the pulse is removed the remanent flux $\phi_{r1}$ is very nearly equal to the saturation flux $\phi_{s1}$ so that even after the blocking pulse is removed there will be a flux distribution in these legs as shown diagrammatically by the arrows in Figure 4. As has been mentioned hereinbefore, a blocking pulse producing ampere-turns which exceed the critical value $NI_{c1}$ will not, however, cause a flux flow through the path formed by the legs 1, 5, 8, 4, 9, 7 as might be expected from the fact that this is the next shortest possible path including the leg 1 to which the blocking pulse is applied. There can be no flux flow through this path because of the fact that the smallest cross-sectional areas of legs 5, 6, and 7 have been made equal to each other. Consequently, by the time leg 6 has become saturated, legs 5 and 7 have also become saturated. The path through legs 1, 5, 8, 4, 9 and 7 is therefore blocked, and the additional flux is forced to flow through the substantially longer path created by the peripheral legs 1, 2, 4, 3. A small amount of leakage flux may pass through legs 8 and 9, but they cannot become saturated. Of course, when leg 4 is saturated, as shown in Figure 4, by flux flowing around the peripheral path, the flux in saturated legs 4 and 6 has the same direction, and the core is blocked to the passage of signal from input winding 12 to output winding 13.

The minimum critical ampere-turns $NI_{c2}$ required to saturate the longer peripheral path 1, 2, 4, 3 is shown plotted in dashed lines in Figure 7. The difference between the values $NI_{c2}$ and $NI_{c1}$ is proportional to the set margin of the core as defined above. Of course, the difference in the enclosed areas of the two hysteresis characteristics is also proportional to the set margin. It is apparent that the critical number of ampere-turns required to saturate the path through legs 1, 5, 8, 4, 9, 7, if such were possible, would be intermediate in value between the values $NI_{c1}$ and $NI_{c2}$ since this path is intermediate in length between paths 1, 5, 6, 7 and 1, 2, 4, 3, and each of these paths has the same smallest cross-sectional area. It therefore follows that, even if the conventional winding is used as illustrated in Figure 3, the set margin of a given two-hole core may be substantially increased by using the two additional apertures or holes C and D, which provide additional legs for the core and thus force the blocking flux into a longer path. In practice, the set margin for a given core has been increased by as much as 45% by providing the original core with the two additional holes C and D.

Figure 5:
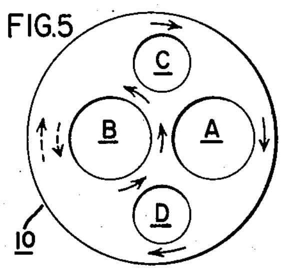

In order to unblock the core of Figure 3 to the passage of signal, a pulse of opposite polarity to that of the blocking pulse is applied to winding 11. When this pulse exceeds the critical value necessary to produce ampere-turns $-NI_{c1}$, the flux in the core has the distribution diagrammatically shown in Figure 5. Since the directions of the flux in legs 4 and 6 respectively are now opposite, an unblocked flux path exists through the legs 4, 8, 6, 9, and an alternating current signal applied to the input winding 12 will be transferred to output winding 13 by transformer action depending upon an interchange of flux between legs 4 and 6.

Figure 6:
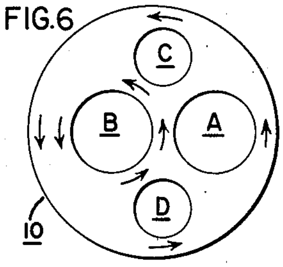

If the unblocking pulse applied to winding 11 creates ampere-turns exceeding the critical value $-NI_{c2}$, however, the flux distribution will then be as shown in Figure 6. It is apparent that in this instance not only the flux in the shorter path 1, 5, 6, 7, but also all of the flux in the longer peripheral path 1, 2, 4, 3 has been reversed and the device is spuriously blocked in the reverse direction. It will, of course, be appreciated that the numerical values of the critical ampere-turns required to saturate the various paths in the core will vary as a function of ambient temperature. This is believed to be due to the fact that at higher temperatures less coercive force is required to align the elementary magnetic domains of the material of the core. Therefore, even if a system includes means to limit the unblocking current to a correct value for one ambient temperature, a change in ambient temperature can result in spurious blocking of the gate and in consequent failure of operation of any system of which it may be a part. Furthermore, the fact that the blocking and unblocking pulses are applied to the same winding makes it necessary that the unblocking pulse have a polarity opposite to that of the blocking pulse. In many applications this requirement is not convenient.

Figure 8 shows a method of winding the cores of Figure 1 or 2 to provide a magnetic inhibiting gate which not only has the improved set margin of the device shown in Figure 3, but which also can be blocked and unblocked by pulses of the same polarity and cannot be spuriously reverse-blocked by an unblocking pulse. In the embodiment of Figure 8 the core 10 is provided with signal input winding 12 and signal output winding 13 on remote peripheral leg 4 and interior leg 6, respectively, as in the embodiment of Figure 3. Leg 1 is provided with a blocking winding 15, whereas legs 2 and 3 the two peripheral legs adjacent to leg 1, are provided with unblocking windings **16*a* and 16*b* respectively. Windings 16*a* and 16*b* may conveniently be connected in electrical series-aiding circuit relation as shown in Figure 8. Each of the windings 12, 13, 15, and 16*b* may conveniently have one end connected to the common ground point 14 as shown. Blocking winding 15** is wound in such a direction that an applied pulse of positive polarity will produce clockwise flux flow. An applied blocking pulse may thus block the core as explained in connection with Figure 3 and result in the flux distribution shown in Figure 4.

Unblocking windings **16*a* and 16*b* on legs 2 and 3, respectively, may conveniently be wound in such a direction that an applied positive pulse will create a counterclockwise flux flow, as illustrated in Figure 10. This counterclockwise flux flow will be confined exclusively to the peripheral path 2, 1, 3, 4 for the following reasons, no matter how large the unblocking pulse may be. Flux changes induced in leg 2 will pass to leg 1 rather than to leg 5 since leg 5 is already saturated in the counterclockwise direction with reference to leg 2. Any path including leg 5 is thus blocked. Similarly, any path which includes leg 7 is blocked due to the flux change induced by the winding 16*b* on leg 3. Thus, when it leaves leg 1, the flux created by winding 16*a* would tend to reverse the direction of flux in leg 7 if it were not for the simultaneous action of the magnetomotive force created by winding 16*b* which tends to maintain the original direction of flux in leg 7. It will be recalled that in the blocked state leg 7 is already saturated in the direction shown in Figure 10. During the unblocking pulse there is no actual flux flow around legs 3, 9, 7, 3, but the magnetomotive force created by windings 16*b* maintains a condition of equilibrium and prevents the reversal of flux in leg 7**, thus confining all of the unblocking flux flow to the peripheral path, no matter how large the unblocking pulse may be.

Flux leaving leg 4 will not pass through the theoretically possible path afforded by legs 8 and 5 for the same reason that flux leaving leg 1 will not pass through leg 7. That is to say, the magnetomotive force created by winding 16$a$ tends to maintain the flux in leg 5 in the direction which it has when the core is blocked. This may be best seen by comparing Figures 4 and 10. Since windings 16$a$ and 16$b$ are provided with the same number of turns and since the same current flows in both windings, equilibrium is established and the flux created by the unblocking pulse will continue to flow entirely in the peripheral path 2, 1, 3, 4, regardless of how large the unblocking pulse is. This flux flow reverses the direction of flux in leg 4 but cannot reverse the direction of flux in leg 6. The core will therefore be unblocked by any pulse above the critical minimum magnitude necessary to reverse all of the flux in the peripheral path, but cannot be reverse-blocked no matter how much the unblocking pulse exceeds this necessary critical minimum magnitude. Hence the unblocking action is absolutely non-critical above a threshold value. That is to say, magnetomotive force or number of ampere-turns which produces a coercive force that exceeds the coercive force of the peripheral magnetic path by any amount will block the core if applied to leg 1 and will unblock the core if applied in the counter-sense to legs 2 and 3.

In practice even when the direction of saturation flux in leg 6 is not changed, flux changes are induced in leg 6 by the blocking and unblocking signals as a consequence of imperfect squareness of the B–H (or $\phi$—NI) characteristics of available core materials. These small flux changes will result in small induced voltages or spurious output in signal output winding 13 for the configuration shown in Figure 8. This difficulty may be overcome, however, by replacing output signal winding 13 on leg 6 with series-connected output signal windings 17$a$ on leg 8 and 17$b$ on leg 9 as shown in Figure 9. The series-connected windings 17$a$ and 17$b$ are so arranged that voltages induced in 17$a$ by small leakage flux changes in leg 8 due to blocking or unblocking pulses are bucked out by voltages induced in 17$b$ by the corresponding flux change in leg 9. It will of course be understood that such leakage flux changes in legs 8 and 9 will be of opposite rotational senses with respect to aperture A. When the core has been unblocked, however, an A.-C. signal applied to winding 12 will result in a transfer of flux back and forth around the path 4, 8, 6, 9, 4 since neither leg 8 nor 9 is saturated and since legs 4 and 6 are saturated in opposite directions. The flux changes induced in legs 8 and 9 by this action are of the same rotational sense with respect to aperture A and the voltages induced in windings 17$a$ and 17$b$ will not then buck each other out but rather will aid each other to produce the desired output signal. It should also be noted that although the circular aperture core of Figure 1 is shown in Figure 9 for clarity of illustration only, in practice the rectangular aperture core of Figure 2 will further reduce the problems resulting from leakage flux in legs 8 and 9 particularly when wound as illustrated in Figure 9.

Except for the manner of winding the output signal winding, the device of Figure 9 is the same as that of Figure 8 and operates in the same manner. It thus affords a single pulse controlled magnetic gate with improved set margin and one which cannot be accidentally reverse-blocked by an unblocking pulse of any magnitude. It also affords faster and less critical switching action and substantially eliminates spurious voltages in the output.

The inhibit gate of Figure 8 may also be converted to a logical "and-or" gate, that is, to a magnetic gate which may be unblocked by unblocking signals applied to either or both of two separate unblocking windings. This may be accomplished as shown in Figure 11 by using wholly separate unblocking windings 18$a$ and 18$b$ on legs 2 and 3, respectively, in place of the series-connected windings 16$a$ and 16$b$ shown in Figure 8. The device of Figure 11 may be blocked by applying a blocking pulse to winding 15. As in the devices of Figures 3, 8 and 9, this will result in a flux distribution as shown in Figure 4.

When unblocking pulses are simultaneously applied to windings 18$a$ and 18$b$, the device of Figure 11 operates in a manner fully equivalent to that of the device of Figure 8. The flux flow and flux distribution are shown in Figure 10. Simultaneously-applied unblocking pulses therefore unblock the core by reversing the flux in the remote peripheral leg 4 thus providing the logical "and" function of the gate.

If an unblocking pulse is applied to winding 18$a$ only, it results in a flux flow and a flux distribution as illustrated in Figure 12, provided that signal input winding 12 is driven from a low impedance or current source. A high impedance source connected to winding 12 will cause it to have the effect of a shorted turn. As shown in Figure 12, flux originating in leg 2 will flow to leg 1 rather than leg 5 since leg 5 is already saturated in the counterclockwise direction around aperture C. With no signal applied to winding 18$b$ however, flux leaving leg 1 will reverse all the flux in legs 7 and 6 and return to leg 2 through unsaturated leg 8. Leg 2 thus becomes saturated by the initial flux flow through this path since the smallest cross-sectional area of each of legs 1, 7, 6 and 8 are equal to that of leg 2. Hence, no matter how large the single unblocking pulse applied to winding 18$a$ may be, there can be no further flux flow around the peripheral path through legs 2, 1, 3, 4 since leg 2 has already become saturated before appreciable flux starts to flow through this latter, substantially longer peripheral path.

The reversal of all the flux in or reverse-saturation of leg 6 results in legs 4 and 6 having flux distributions directed as shown in Figure 12, and the core is thus unblocked to the passage of signal from input winding 12 to output winding 13 by flux linking legs 4, 9, 6 and 8 bounding the aperture A. A similar type of action occurs if an unblocking signal is applied only to winding 18$b$ and results in the flux distribution illustrated in Figure 13. In this case the unblocking flux flow is through the path provided by legs 3, 9, 6, 5, 1, 3. It will be noted that the unblocking flux does not flow through leg 7 since this leg is already saturated in the direction in which the unblocking flux tends to flow. Furthermore, leg 3 like leg 2, has a cross-sectional area such that it will saturate before flux starts to flow around the peripheral path 3, 4, 2, 1, 3. Since leg 3 cannot provide a return path for such peripheral flow, there is again no danger of reverse-blocking by a large unblocking pulse. It is thus seen that a single unblocking pulse applied to either of windings 18$a$ or 18$b$ will unblock the core of Figure 11 by reversing the flux in interior leg 6 and thus provide the logical "or" function of the gate. This unblocking pulse must have a sufficient minimum current amplitude so that the resulting ampere turns will exceed the critical coercive value for the flux path illustrated in Figs. 12 and 13, which value approaches the value $NI_{c2}$ as shown in Fig. 7. Of course where only one of two unblocking windings is used, there must be a corresponding increase in pulse current amplitude above the amplitude required where both windings are energized so as to obtain the required ampere turn value. The device of Figure 11 may thus be used as a logical "and-or" gate with stored setting in any desired information or data handling system even under conditions where ambient temperature changes may affect the B–H characteristic of the core or where critical limits on the magnitude of the unblocking pulses are not easily maintained. Furthermore, extremely rapid switching of the gate is possible due to the large unblocking currents which may be used.

Of course, single unblocking signals representing the "or" function of the gate will themselves directly induce pulses of substantial magnitude in the output winding 13 of the device of Figure 11 since they result in full flux flow through leg 6 and leg 8 or 9 during the switching interval. This does not occur when the gate is unblocked by an "and" signal since in this case it is only flux in peripheral leg 4 rather than that in interior leg 6 which is reversed. It will of course be understood that any change in flux in legs 6, 8 or 9 during peripheral unblocking via leg 4, due to leakage or an imperfect square-loop B–H characteristic, is of a substantially smaller order of magnitude than the complete flux reversal which occurs in leg 6 during unblocking via leg 6 itself. These initial transient pulses induced in winding 13 when the gate is unblocked by an "or" signal are superimposed upon the normal A.-C. output signal derived from the A.-C. input after the gate is unblocked, and are simply "noise" when the gate is used for the "and-or" function. If desired, however, the presence or absence of these unblocking pulses may be detected by any suitable external circuitry and may thus afford an indication of whether the gate has been unblocked by an "or" signal or an "and" signal. One may, for example, derive a portion of the output through a clipping circuit 19 which will only pass signals having an amplitude slightly greater than that of the normal A.-C. output signal. Such a clipping circuit may, for example, consist of a simple biased diode as is well known in the art. Transient blocking pulses induced in winding 13 will, of course, have a polarity opposite to that of the transient unblocking pulses. The two types of transients may therefore be readily distinguished from each other and from the A.-C. signal amplitudes and polarities. The device of Figure 11 may thus also be used for "exclusive or" or "coincident and" logical functions by detecting the presence or absence of this transient unblocking voltage as well as the A.-C. signal to determine whether the gate was unblocked by an "and" or by an "or" signal. Of course, output winding 13 could also be placed on peripheral leg 4 with input winding 12 on either leg 6 or leg 4. In this arrangement an unblocking pulse will be passed by the clipper only when the gate is unblocked by coincident "and" pulses. In either arrangement, of course, the stored setting of the gate can only be read by the A.-C. output derived from the A.-C. input signal. This stored setting corresponds, as noted above, to an "and-or" logic. The transient unblocking pulses derived from the output of the clipper 19 do, however, provide a useful initial indication of whether this stored setting was obtained from "and" or from "or" signals. If desired, the transient pulse may, for example, be used to actuate any convenient switching circuit which routes the A.-C. output to one of two possible output circuits.

Of course, if the operating speed requirements of any given system are such that one does not need the speed advantage which can be obtained by using large unblocking currents, then the device of Figure 11 may be operated as a pure "coincident and" gate by applying half-pulses to each of the unblocking windings 18*a* and 18*b*. By a half-pulse is means a pulse the energy of which is more than half of the energy required to unblock the core via the peripheral path including leg 4 but is less than the energy required to unblock the core via either the peripheral or the interior legs. Such action is possible since the flux paths illustrated in Figures 12 and 13 have path lengths which are equal to more than half the path length of the peripheral path illustrated in Figure 10. When either half-pulse occurs alone the core remains blocked, but when both half-pulses are applied simultaneously the core is unblocked by reversal of the flux in leg 4 via the peripheral path shown in Figure 10.

It is thus seen that, if high energy pulses or large currents are applied to unblocking windings 18*a* and 18*b* of the device of Figure 11, the core functions as an "and-or" gate with stored setting and affords very rapid switching action. If slower speeds can be tolerated and if half-pulses are applied to windings 18*a* and 18*b*, the device of Figure 11 functions as a "coincident and" gate with stored setting. In the former or unlimited current mode a transient indication of "exclusive or" or "coincident and" unblocking may be obtained.

Although the circuits of Figures 3, 8, 9 and 11 have, for convenience and clarity of illustration, been shown wound on the core of Figure 1, it will of course be understood that any of these circuits may be wound on the core of Figure 2, for example, or upon any equivalent core. Furthermore, although the unblocking windings in the circuits of Figures 8, 9 and 11 have been shown as being wound to accept unblocking pulses having the same polarity as the blocking pulse applied to the separate blocking winding (since in practice this is more frequently the desired mode of operation), it will of course be understood that if it is desired to have any or all of the unblocking windings respond to pulses of polarity opposite to that of the blocking pulse, one need only reverse the sense or phasing of the winding. It will also be understood that in the device of Figure 11 any desired number of separate unblocking windings may be placed on either of legs 2 and 3 to provide for more than two unblocking inputs. If there are $n$ windings on leg 2 and $m$ windings on leg 3, then the gate may be unblocked by a pulse applied to any one of the $(n+m)$ windings. The initial or transient unblocking pulse will be absent in the output only if both one of the $n$ windings and one of the $m$ windings have been simultaneously or coincidentally actuated. This use of a plurality of inputs is made possible by the fact that the device cannot be reverse-blocked by an excessively large unblocking pulse.

It is apparent that the basic operations, "not," "or," "and," and "and-or," of Boolean algebra and symbolic logic can be instrumented by the devices of the present invention. Thus, the device of Figure 9 affords an "inhibit" or "not" gate the output from which does not contain either spurious pulses due to leakage or transient unblocking pulses. The device of Figure 11, on the other hand, provides an "and-or" gate in which the transient unblocking pulses may be utilized to distinguish between the "exclusive or" and the "coincident and" functions. It will be apparent to those skilled in the art that many more complex networks may be devised by using a plurality of these gates to combine the basic operations of "not," "or," "and," and "and-or" in accordance with well known techniques of logical network design.

While the principles of the invention have now been made clear in illustrative embodiments, there will be immediately obvious to those skilled in the art many modifications in structure, arrangement, proportions, the elements and components used in the practice of the invention, and otherwise, which are particularly adapted for specific environments and operating requirements without departing from those principles. The appended claims are therefore, intended to cover and embrace such modifications, within the limits only of the true spirit and scope of the invention.

What we claim as new and desire to secure by Letters Patent of the United States is:

1. A signal translating device comprising, a nine-legged core having four separate mutually contiguous apertures formed therein and being constructed of material having a substantially rectangular magnetic hysteresis characteristic; the material between any two of the four separate mutually contiguous apertures in said core forming one of five interior legs of said nine-legged core; the material between any one of said apertures in said core and the periphery of said core forming one of four peripheral legs of said nine-legged core; the smallest cross-sectional area of a first of said peripheral legs being at least equal to twice the smallest cross-sectional area of any one of the other eight legs of said core; a control winding on said first peripheral leg, a first signal translating winding on the peripheral leg most remote from said first peripheral leg, and a second signal translating winding on at least one of the interior legs adjoining the same aperture that is adjoined by said remote peripheral leg; said control winding being adapted to control the passage of alternating current signal between said signal translating windings by varying the flux in the legs of said core through at least two separate magnetic circuits, a first of said magnetic circuits including said first peripheral leg and the interior legs adjoining the same aperture that is adjoined by said first peripheral leg and a second of said magnetic circuits including all four of said peripheral legs of said core.

2. A signal translating device comprising a nine-legged core having four separate mutually contiguous apertures formed therein and being constructed of material having a substantially rectangular magnetic hysteresis characteristic; the material between any two of the four separate mutually contiguous apertures in said core forming one of five interior legs of said core, the smallest cross-sectional area of each of said interior legs being substantially equal to a common predetermined value; the material between any one of said apertures and the periphery of said core forming one of four peripheral legs of said nine-legged core; the smallest cross-sectional area of a first of said peripheral legs being equal to at least twice the smallest cross-sectional area of each of said interior legs, the smallest cross-sectional area of the other three of said peripheral legs being substantially equal to said common value of cross-sectional area of said interior legs; first and second signal translating windings linked by a magnetic circuit including the peripheral leg most remote from said first peripheral leg and the interior legs adjoining the same aperture adjoined by said remote peripheral leg; a blocking winding on said first peripheral leg, and at least one unblocking winding on at least one of the peripheral legs adjacent to said first peripheral leg; said blocking winding being adapted to block said core and said unblocking winding being adapted to unblock said core to the passage of an alternating current signal between said signal translating windings in response to any current above a minimum critical magnitude passed through said blocking or unblocking windings respectively.

3. A signal translating device comprising, a nine-legged core having four separate mutually contiguous apertures formed therein and being constructed of material having a substantially rectangular magnetic hysteresis characteristic; the material between any two of the four separate mutually contiguous apertures in said core forming one of five interior legs of said core, the smallest cross-sectional area of each of said interior legs being substantially equal to a common predetermined value; the material between any one of said apertures and the periphery of said core forming one of four peripheral legs of said nine-legged core; the smallest cross-sectional area of a first of said peripheral legs being equal to at least twice said common value of smallest cross-sectional area of said interior legs, the smallest cross-sectional area of the other three of said peripheral legs being substantially equal to said common value; a first control winding on said first peripheral leg, second and third control windings respectively on the two peripheral legs adjacent to said first peripheral leg, first and second signal translating windings linked by a magnetic circuit including the fourth of said peripheral legs and the interior legs adjoining the same aperture adjoined by said fourth peripheral leg; said first control winding being adapted to block said core and said second and third windings being adapted to unblock said core to the passage of signal in response to currents passed through said respective windings.

4. A signal translating device comprising, a nine-legged core having four separate mutually contiguous apertures formed therein and being constructed of material having a substantially rectangular magnetic hysteresis characteristic; the material between the periphery of said core and a first of the apertures in said core forming a first peripheral leg, the material between the periphery of said core and a second and a third of the apertures in said core forming second and third peripheral legs respectively adjacent to said first peripheral leg, the material between the periphery of said core and a fourth of the apertures in said core forming a fourth peripheral leg remote from said first leg; the material between any two of the four separate mutually contiguous apertures forming one of five interior legs of said nine-legged core; each of said interior legs and said second, third and fourth peripheral legs having its smallest cross-sectional area, equal to a predetermined common value, said first peripheral leg having a smallest cross-sectional area equal to at least twice said common predetermined value of smallest cross-sectional area of said other legs; a signal input winding, a signal output winding, said input and output windings being linked by a magnetic circuit consisting of said fourth peripheral leg and the interior legs adjoining said fourth aperture, and control winding means to block and unblock said core to the passage of alternating current signal between said signal input and output windings.

5. Apparatus as in claim 4 wherein said winding means to block and unblock said core consists of a single winding on said first peripheral leg, whereby a current of one polarity in said winding will block said core by driving flux through a first magnetic circuit comprising the legs adjoining said first aperture and then through a second magnetic circuit comprising all of the peripheral legs of said core, and a current of opposite polarity in said winding will unblock said core by reversing at least part of the flux in all of the legs forming said first magnetic circuit.

6. Apparatus as in claim 4 wherein said winding means to block and unblock said core consists of a blocking winding on said first peripheral leg and unblocking windings on said second and third peripheral legs, said unblocking windings being connected in electrical series-aiding circuit relationship, whereby a current in said blocking winding will block said core by driving flux through a first magnetic circuit comprising the legs adjoining said first aperture and then through a second magnetic circuit comprising all of the peripheral legs of said core, and whereby a current in said unblocking windings will unblock said core by reversing at least part of the flux in all the peripheral legs forming said second magnetic circuit without altering the flux direction in any of said interior legs.

7. Apparatus as in claim 4 wherein said signal output winding consists of a first winding on said interior leg between said second and fourth apertures and a second winding on said interior leg between said third and fourth apertures, said first and second windings being connected in electrical series circuit relationship to form said output winding so that voltages induced in said first and second windings by small flux changes in said interior legs due to leakage when said core is blocked or unblocked will be of opposite polarity and will therefore not appear at the terminals of said output winding.

8. Apparatus as in claim 4 wherein said winding means to block and unblock said core comprises a blocking winding on said first peripheral leg and at least one separate unblocking winding on each of said second and third peripheral legs respectively, whereby said core may be blocked by a current passing through said blocking winding and may be unblocked either by a current passing through a single unblocking winding on either of said second or third peripheral legs or by separate currents simultaneously passing through one unblocking winding on said second peripheral leg and one unblocking winding on said third peripheral leg.

9. A logical "and-or" gate comprising, a nine-legged core having four separate mutually contiguous apertures formed therein and being constructed of material having a substantially rectangular magnetic hysteresis characteristic; the material between the periphery of said core and a first of the apertures in said core forming a first peripheral leg, the material between the periphery of said core and a second and a third of the apertures in said core forming second and third peripheral legs adjacent to said first peripheral leg, the material between the periphery of said core and a fourth of the apertures in said core forming a fourth peripheral leg remote from said first leg, the material between any two of the four separate mutually contiguous apertures forming one of five interior legs of said nine-legged core; each of said interior legs and said second, third, and fourth peripheral legs having its smallest cross-sectional area equal to a predetermined common value; said first peripheral leg having a smallest cross-sectional area equal to at least twice said predetermined common value of cross-sectional area of said other legs; a blocking winding on said first peripheral leg, a first unblocking winding on said second peripheral leg, a second unblocking winding on said third peripheral leg; an alternating current signal input winding, an alternating current signal output winding, said input and output windings being linked by a magnetic circuit comprising said fourth peripheral leg and the interior legs adjoining said fourth aperture; and a clipping circuit connected to have a portion of the output from said output winding applied thereto, whereby said core may be blocked to the transmission of alternating current signal by a current passed through said blocking winding and may be unblocked to permit transmission of alternating current signal either by a current passing through a single unblocking winding on one or the other of said second and third peripheral legs or by separate currents simultaneously passing through one unblocking winding on each of said second and said third peripheral legs, the presence or absence of output from said clipping circuit indicating whether said core has been unblocked by currents applied to one or both of said second and third peripheral leg windings.

References Cited in the file of this patent

"The Transfluxor" by J. A. Rajchman and A. W. Lo, Proceedings of the IRE, March 1956, pages 321–332.